(12) United States Patent
DeLapp et al.

(10) Patent No.: US 12,085,724 B1
(45) Date of Patent: Sep. 10, 2024

(54) WAVEGUIDE DEFORMATION SENSING

(71) Applicant: Apple Inc., Cupertino, CA (US)

(72) Inventors: Scott M DeLapp, San Diego, CA (US); Hyungryul Choi, San Jose, CA (US); Vikrant Bhakta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/326,400

(22) Filed: May 31, 2023

Related U.S. Application Data

(60) Provisional application No. 63/353,335, filed on Jun. 17, 2022.

(51) Int. Cl.
*G02B 27/01* (2006.01)
*G02B 6/10* (2006.01)

(52) U.S. Cl.
CPC ......... *G02B 27/0176* (2013.01); *G02B 6/102* (2013.01); *G02B 27/0172* (2013.01); *G02B 2027/011* (2013.01); *G02B 2027/0178* (2013.01)

(58) Field of Classification Search
CPC ............... G02B 27/01–0189; G02B 2027/0105–0198; G02B 6/10; G02B 6/102
See application file for complete search history.

(56) References Cited

U.S. PATENT DOCUMENTS

| | | | | |
|---|---|---|---|---|
| 6,567,570 B1 * | 5/2003 | Steinle | ..................... | H04N 1/40 382/312 |
| 11,520,152 B1 | 12/2022 | Lau et al. | | |
| 11,722,654 B1 * | 8/2023 | Sutton | ................ | G02B 27/4233 348/177 |
| 11,768,377 B2 * | 9/2023 | Edwin | ..................... | G02B 6/00 345/419 |
| 11,876,952 B2 * | 1/2024 | Churin | ................. | H04N 13/327 |
| 11,933,975 B2 * | 3/2024 | Amirsolaimani | ...... | G02B 6/356 |
| 2020/0174255 A1 | 6/2020 | Hollands et al. | | |
| 2021/0302745 A1 | 9/2021 | Mutlu et al. | | |

(Continued)

FOREIGN PATENT DOCUMENTS

WO 2022115485 A2 6/2022

OTHER PUBLICATIONS

U.S. Appl. No. 17/202,198, filed Mar. 15, 2021.
U.S. Appl. No. 17/191,183, filed Mar. 3, 2021.

*Primary Examiner* — Gene W Lee
(74) *Attorney, Agent, or Firm* — Treyz Law Group, P.C.; Michael H. Lyons; Jinie M. Guihan

(57) ABSTRACT

A head-mounted device may have projector, a first waveguide, a second waveguide, and an optical bridge sensor coupled between the first and second waveguides. An input coupler may couple light with a calibration pattern into the first waveguide. The calibration pattern may be included in visible or infrared light produced by the projector or may be included in infrared light produced by infrared emitters mounted to the first waveguide. An output coupler may couple the light having the calibration pattern out of the first waveguide. An additional output coupler may be used to couple visible light from the projector out of the waveguide and towards an eye box. An image sensor may generate image sensor data based on the light having the calibration pattern. Control circuitry may process the calibration pattern in the image sensor data to detect deformation or warping of the first waveguide.

20 Claims, 8 Drawing Sheets

(56) References Cited

U.S. PATENT DOCUMENTS

2023/0237678 A1\* 7/2023 Tervonen ........... G02B 27/0172
    345/633
2023/0239455 A1\* 7/2023 Churin ................. H04N 13/398
    348/53

\* cited by examiner

WAVEGUIDE DEFORMATION SENSING

This application claims the benefit of U.S. Provisional Patent Application No. 63/353,335, filed Jun. 17, 2022, which is hereby incorporated by reference herein in its entirety.

FIELD

This relates generally to electronic devices, and, more particularly, to electronic devices such as head-mounted devices.

BACKGROUND

Electronic devices have components such as displays and other optical components. During operation, there is a risk that components may become deformed in a manner that impacts optical performance due to drop events, thermal effects, and other undesired stressing events. This poses challenges for ensuring satisfactory display performance.

SUMMARY

A head-mounted device such as a pair of glasses may have a head-mounted housing. The head-mounted device may include displays such as projector displays and may include associated optical components. The housing may have a first portion, a second portion, and a nose bridge that couples the first portion to the second portion. A first display having a first projector and a first waveguide may be mounted in the first portion of the housing. A second display having a second projector and a second waveguide may be mounted in the second portion of the housing.

An optical bridge sensor may be disposed in the nose bridge and may couple the first waveguide to the second waveguide. The first projector may produce first image light coupled into the first waveguide. The first waveguide may direct a first portion of the first image light to a first eye box and may direct a second portion of the first image light to the optical bridge sensor. The second waveguide may direct a first portion of the second image light to a second eye box and may direct a second portion of the second image light to the optical bridge sensor. The optical bridge sensor may gather image sensor data from the second portion of the first and second image light.

The projector(s) may generate a calibration pattern in the first and/or second image light. The control circuitry may detect a deformation in the first and/or second waveguides based on the calibration pattern as included in the image sensor data gathered by the optical bridge sensor. The control circuitry may detect the deformation by generating a point spread function for the calibration pattern and by comparing the point spread function to a nominal point spread function for the calibration pattern. The calibration pattern may be included in the visible light of the first and/or second image light. Alternatively, the calibration pattern may be included in infrared light coupled into the waveguide(s). The infrared light may be produced by infrared emitters in the projector(s) and/or by infrared emitters mounted to the waveguide.

DETAILED DESCRIPTION

Figure 1:
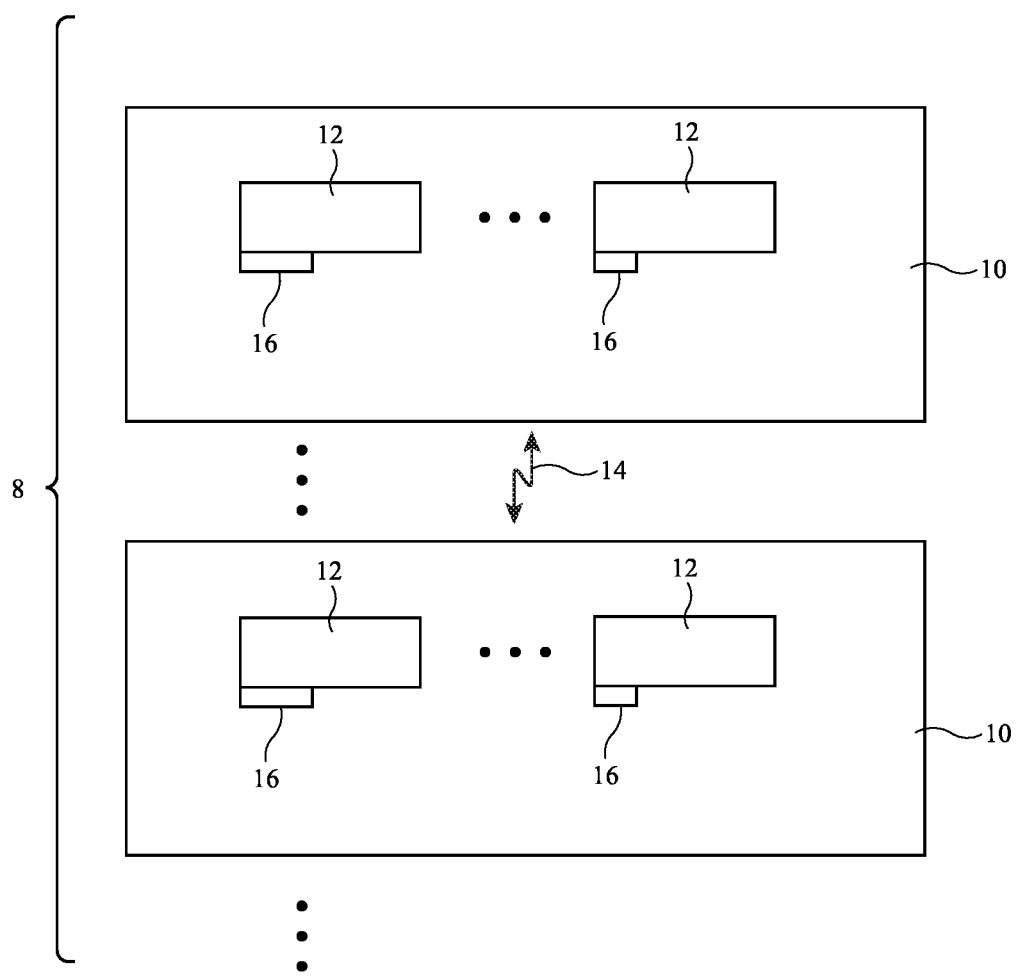
FIG. 1 is a diagram of an illustrative system in accordance with some embodiments.

A system may include one or more electronic devices. Each device may contain optical components and other components. FIG. 1 is a schematic diagram of an illustrative system of the type that may include one or more electronic devices with optical components. As shown in FIG. 1, system 8 may include electronic devices 10. Devices 10 may include head-mounted devices (e.g., goggles, glasses, helmets, and/or other head-mounted devices), cellular telephones, tablet computers, peripheral devices such as headphones, game controllers, and/or other input devices. Devices 10 may, if desired, include laptop computers, computer monitors containing embedded computers, desktop computers, media players, or other handheld or portable electronic devices, smaller devices such as wristwatch devices, pendant devices, ear buds, or other wearable or miniature devices, televisions, computer displays that do not contain embedded computers, gaming devices, remote controls, embedded systems such as systems in which equipment is mounted in a kiosk, in an automobile, airplane, or other vehicle, removable external cases for electronic equipment, straps, wrist bands or head bands, removable covers for electronic devices, cases or bags that receive and carry electronic equipment and other items, necklaces or arm bands, wallets, sleeves, pockets, or other structures into which electronic equipment or other items may be inserted, part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, system 8 includes a head-mounted device such as a pair of glasses (sometimes referred to as augmented reality glasses). System 8 may also include peripherals such as headphones, game controllers, and/or other input-output devices (as examples). In some scenarios, system 8 may include one or more stand-alone devices 10. In other scenarios, multiple devices 10 in system 8 exchange information using wired and/or wireless links, which allows these devices 10 to be used together. For example, a first of devices 10 may gather user input or other input that is used to control a second of devices 10 (e.g., the first device may be a controller for the second device). As another example, a first of devices 10 may gather input that is used in controlling a second device 10 that, in turn, displays content on a third device 10.

Devices 10 may include components 12. Components 12 may include control circuitry. The control circuitry may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in the control circuitry may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and/or to support communications between equipment in system 8 and external electronic equipment, devices 10 may include wired and/or wireless communications circuitry. The communications circuitry of devices 10, which may sometimes be referred to as control circuitry and/or control and communications circuitry, may include antennas, radio-frequency transceiver circuitry, and other wireless communications circuitry and/or wired communications circuitry. The communications circuitry of devices 10 may, for example, support bidirectional wireless communications between devices 10 over wireless links such as wireless link 14 (e.g., a wireless local area network link, a near-field communications link, or other suitable wired or wireless communications link (e.g., a Bluetooth® link, a WiFi® link, a 60 GHz link or other millimeter wave link, etc.). Components 12 may also include power circuits for transmitting and/or receiving wired and/or wireless power and may include batteries.

Components 12 may include input-output devices. The input-output devices may be used in gathering user input, in gathering information on the environment surrounding the user, and/or in providing a user with output. The input-output devices may include sensors such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, and/or other sensors. In some arrangements, devices 10 may use sensors and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Components 12 may include haptic output devices. The haptic output devices can produce motion that is sensed by the user (e.g., through the user's head, hands, or other body parts). Haptic output devices may include actuators such as electromagnetic actuators, motors, piezoelectric actuators, electroactive polymer actuators, vibrators, linear actuators, rotational actuators, actuators that bend bendable members, etc.

If desired, input-output devices in components 12 may include other devices such as displays (e.g., to display images for a user), status indicator lights (e.g., a light-emitting diode that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), etc.

As shown in FIG. 1, sensors such as position sensors 16 may be mounted to one or more of components 12. Position sensors 16 may include accelerometers, magnetic sensors such as compass sensors, gyroscopes, and/or inertial measurement units (IMUs) that contain some or all of these sensors. Position sensors 16 may be used to measure location (e.g., location along X, Y, and Z axes), orientation (e.g., angular orientation around the X, Y, and Z axes), and/or motion (changes in location and/or orientation as a function of time). Sensors such as position sensors 16 that can measure location, orientation, and/or motion may sometimes be referred to herein as position sensors, motion sensors, and/or orientation sensors.

Devices 10 may use position sensors 16 to monitor the position (e.g., location, orientation, motion, etc.) of devices 10 in real time. This information may be used in controlling one or more devices 10 in system 8. As an example, a user may use a first of devices 10 as a controller. By changing the position of the first device, the user may control a second of devices 10 (or a third of devices 10 that operates in conjunction with a second of devices 10). As an example, a first device may be used as a game controller that supplies user commands to a second device that is displaying an interactive game.

Devices 10 may also use position sensors 16 to detect any changes in position of components 12 with respect to the housings and other structures of devices 10 and/or with respect to each other. For example, a given one of devices 10 may use a first position sensor 16 to measure the position of a first of components 12, may use a second position sensor 16 to measure the position of a second of components 12, and may use a third position sensor 16 to measure the position of a third of components 12. By comparing the measured positions of the first, second, and third components (and/or by using additional sensor data), device 10 can determine whether calibration operations should be performed, how calibration operations should be performed, and/or when/how other operations in device 10 should be performed.

Figure 2:
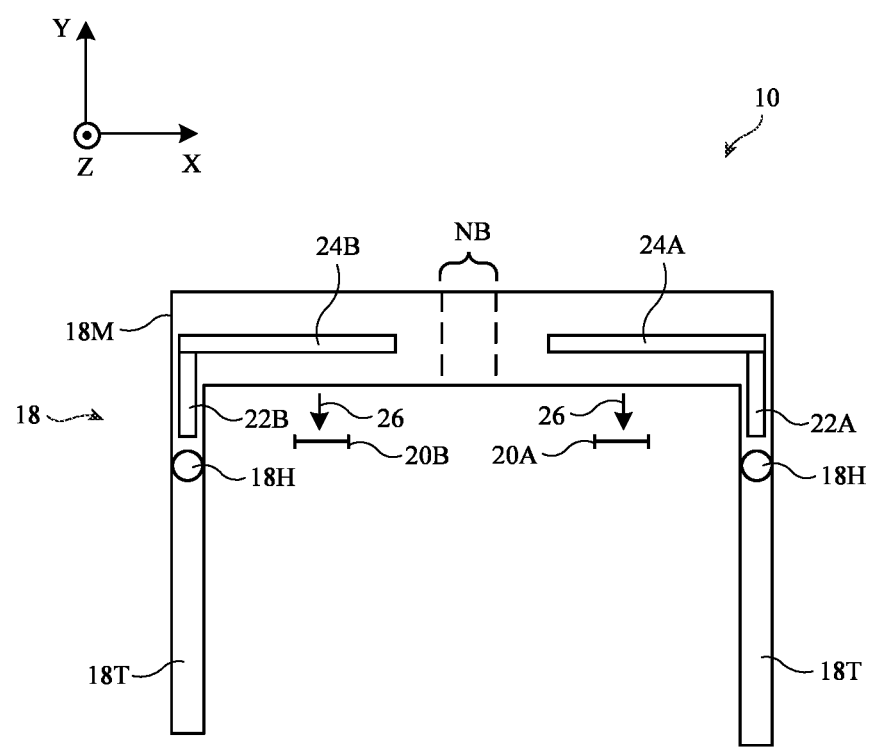
FIG. 2 is a top view of an illustrative head-mounted device in accordance with some embodiments.

In an illustrative configuration, devices 10 include a head-mounted device such as a pair of glasses (sometimes referred to as augmented reality glasses). A top view of device 10 in an illustrative configuration in which device 10 is a pair of glasses is shown in FIG. 2. A shown in FIG. 2, device 10 may include housing 18. Housing 18 may include a main portion (sometimes referred to as a glasses frame) such as main portion 18M and temples 18T that are coupled to main portion 18M by hinges 18H. Nose bridge portion NB may have a recess that allows housing 18 to rest on a nose of a user while temples 18T rest on the user's ears.

Images may be displayed in eye boxes 20 using displays 22 and waveguides 24. Displays 22 may sometimes be referred to herein as projectors 22, projector displays 22, display projectors 22, light projectors 22, image projectors 22, light engines 22, or display modules 22. Projector 22 may include a first projector 22B (sometimes referred to herein as left projector 22B) and a second projector 22A (sometimes referred to herein as right projector 22A). Projectors 22A and 22B may be mounted at opposing right and left edges of main portion 18M of housing 18, for example. Eye boxes 20 may include a first eye box 20B (sometimes referred to herein as left eye box 20B) and may include a second eye box 20A (sometimes referred to herein as right eye box 20A). Waveguides 24 may include a first waveguide 24B (sometimes referred to herein as left waveguide 24B) and a second waveguide 24A (sometimes referred to herein as right waveguide 24A). Main portion 18M of housing 18 may, for example, have a first portion that includes projector 22B and waveguide 24B and a second portion that includes projector 22A and waveguide 24A (e.g., where nose bridge NB separates the first and second portions such that the first portion is at a first side of the nose bridge and the second portion is at a second side of the nose bridge).

Waveguides 24 may each include one or more stacked substrates (e.g., stacked planar and/or curved layers sometimes referred to herein as waveguide substrates) of optically transparent material such as plastic, polymer, glass, etc. If desired, waveguides 24 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguides 24 may include holographic phase gratings such as volume holograms or thin-film holograms, meta-gratings, or any other desired diffractive grating structures. The diffractive gratings on waveguides 24 may also include surface relief gratings (SRGs) formed on one or more surfaces of the substrates in waveguides 24, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Waveguides 24 may have input couplers that receive light from projectors 22. This image light is then guided laterally (along the X axis) within waveguides 24 in accordance with the principal of total internal reflection. Each waveguide 24 may have an output coupler in front of a respective eye box 20. The output coupler couples the image light out of the waveguide 24 and directs an image towards the associated eye box 20 for viewing by a user (e.g., a user whose eyes are located in eye boxes 20), as shown by arrows 26. Input and output couplers for device 10 may be formed from diffractive gratings (e.g., surface relief gratings, volume holograms, etc.) and/or other optical structures.

For example, as shown in FIG. 2, projector 22B may emit (e.g., produce, generate, project, or display) image light that is coupled into waveguide 24B (e.g., by a first input coupler on waveguide 24B). The image light may propagate in the +X direction along waveguide 24B via total internal reflection. The output coupler on waveguide 24B may couple the image light out of waveguide 24B and towards eye box 20B (e.g., for view by the user's left eye at eye box 20B). Similarly, projector 22A may emit (e.g., produce, generate, project, or display) image light that is coupled into waveguide 24A (e.g., by a second input coupler on waveguide 24A). The image light may propagate in the −X direction along waveguide 24A via total internal reflection. The output coupler on waveguide 24A may couple the image light out of waveguide 24A and towards eye box 20A (e.g., for view by the viewer's right eye at eye box 20A).

Figure 3:
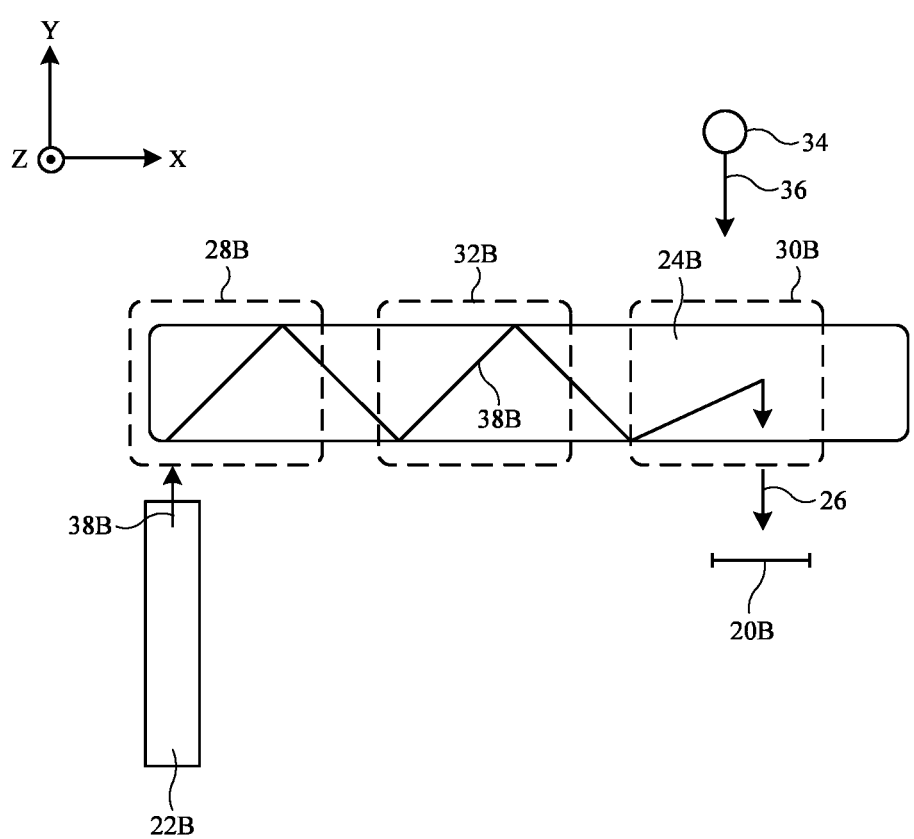
FIG. 3 is a top view of an illustrative display projector and waveguide for providing image light to an eye box in accordance with some embodiments.

FIG. 3 is a top view showing how waveguide 24B may provide light to eye box 20B. As shown in FIG. 3, projector 22B may emit image light 38B that is provided to waveguide 24B. Projector 22B may include collimating optics (sometimes referred to as an eyepiece, eyepiece lens, or collimating lens) that help direct image light 38B towards waveguide 24B. Projector 22B may generate image light 38B associated with image content to be displayed to (at) eye box 20B. Projector 22B may include light sources that produce image light 38B (e.g., in scenarios where projector 22B is an emissive display module, the light sources may include arrays of light emitters such as LEDs) or may include light sources that produce illumination light that is provided to a spatial light modulator in projector 22B. The spatial light modulator may modulate the illumination light with (using) image data (e.g., a series of image frames) to produce image light 38B (e.g., image light that includes images as identified by the image data). The spatial light modulator may be a transmissive spatial light modulator (e.g., may include a transmissive display panel such as a transmissive LCD panel) or a reflective spatial light modulator (e.g., may include a reflective display panel such as a DMD display panel, an LCOS display panel, an fLCOS display panel, etc.).

Waveguide 24B may be used to present image light 38B output from projector 22B to eye box 20B. Waveguide 24B may include one or more optical couplers such as input coupler 28B, cross-coupler 32B, and output coupler 30B. In the example of FIG. 3, input coupler 28B, cross-coupler 32B, and output coupler 30B are formed at or on waveguide 24B. Input coupler 28B, cross-coupler 32B, and/or output coupler 30B may be completely embedded within the substrate layers of waveguide 24B, may be partially embedded within the substrate layers of waveguide 24B, may be mounted to waveguide 24B (e.g., mounted to an exterior surface of waveguide 24B), etc.

The example of FIG. 3 is merely illustrative. One or more of these couplers (e.g., cross-coupler 32B) may be omitted. Waveguide 24B may be replaced with multiple waveguides that are laterally and/or vertically stacked with respect to each other. Each of these waveguides may include one, two, all, or none of couplers 28B, 32B, and 30B. Waveguide 24B may be at least partially curved or bent if desired.

Waveguide 24B may guide image light 38B down its length via total internal reflection. Input coupler 28B may be configured to couple image light 38B into waveguide 24B, whereas output coupler 30B may be configured to couple image light 38B from within waveguide 24B to the exterior of waveguide 24B and towards eye box 20B. Input coupler 28B may include an input coupling prism, one or more mirrors (e.g., louvered partially reflective mirrors), or diffractive gratings such as an SRG or a set of volume holograms, as examples.

As shown in FIG. 3, projector 22B may emit image light 38B in the +Y direction towards waveguide 24B. When image light 38B strikes input coupler 28B, input coupler 28B may redirect image light 38B so that the light propagates within waveguide 24B via total internal reflection towards output coupler 30B (e.g., in the +X direction). When image light 38B strikes output coupler 30B, output coupler 30B may redirect image light 38B out of waveguide 24B towards eye box 20B (e.g., back in the −Y direction). In scenarios where cross-coupler 32B is formed at waveguide 24B, cross-coupler 32B may redirect image light 38B in one or more directions as it propagates down the length of waveguide 24B, for example. Cross-coupler 32B may expand a pupil of image light 38B if desired.

Input coupler 28B, cross-coupler 32B, and/or output coupler 30B may be based on reflective and refractive optics or may be based on holographic (e.g., diffractive) optics. In arrangements where couplers 28B, 30B, and 32B are formed from reflective and refractive optics, couplers 28B, 30B, and 32B may include one or more reflectors (e.g., an array of micromirrors, partial mirrors, louvered mirrors, or other reflectors). In arrangements where couplers 2B8, 30B, and 32B are based on holographic optics, couplers 28B, 30B, and 32B may include diffractive gratings (e.g., volume holograms, surface relief gratings, etc.). Any desired combination of holographic and reflective optics may be used to form couplers 28B, 30B, and 32B. In one suitable arrangement that is sometimes described herein as an example, input coupler 28B, cross-coupler 32B, and output coupler 30B each include surface relief gratings (e.g., surface relief gratings formed by modulating the thickness of one or more layers of surface relief grating substrate in waveguide 24B).

In an augmented reality configuration, waveguide 24B may also transmit (pass) real-world light from the scene/environment in front of (facing) device 10. The real-world light (sometimes referred to herein as world light or environmental light) may include light emitted and/or reflected by objects in the scene/environment in front of device 10. For example, output coupler 30B may transmit world light 36 from real-world objects 34 in the scene/environment in front of device 10. Output coupler 30B may, for example, diffract image light 38B to couple image light 38B out of waveguide 24B and towards eye box 20B while transmitting world light 36 (e.g., without diffracting world light 36) to eye box 20B. This may allow images in image light 38B to be overlaid with world light 36 of real-world objects 34 (e.g., to overlay virtual objects from image data in image light 38B as displayed by projector 22B with real-world objects 34 in front of the user when viewed at eye box 20A).

In the example of FIG. 3, only the waveguide and projector for providing image light to eye box 20B is shown for the sake of clarity. Waveguide 24A (FIG. 2) may include similar structures for providing light to eye box 20A. During operation of device 10 (e.g., by an end user), mechanical stresses, thermal effects, and other stressors may alter the alignment between two or more components of device 10. Some or all of these effects may also cause waveguide 24B to become deformed over time.

For example, the optical alignment between the components of device 10 may change and/or waveguide 24B may become deformed when the user places device 10 on their head, removes device 10 from their head, places device 10 on a surface or within a case, or drops device 10 on the ground, when a mechanical impact event occurs at device 10, when device 10 enters different environments at different temperatures or humidities, when a user bends, stresses, or shakes one or more components in device 10, etc. If care is not taken, these changes in optical alignment and waveguide deformation can undesirably affect the images provided to eye boxes 20A and/or 20B (e.g., can produce visible misalignment or distortion at one or both eye boxes 20A and 20B). As these changes in optical alignment and deformation will vary by user and from system-to-system, it may be desirable to actively identify such changes in the field (e.g., during operation of device 10 by an end user rather than in-factory during the manufacture of device 10) so that suitable action can be taken to mitigate the identified changes to provide an optimal display experience for the user over time.

Figure 4:
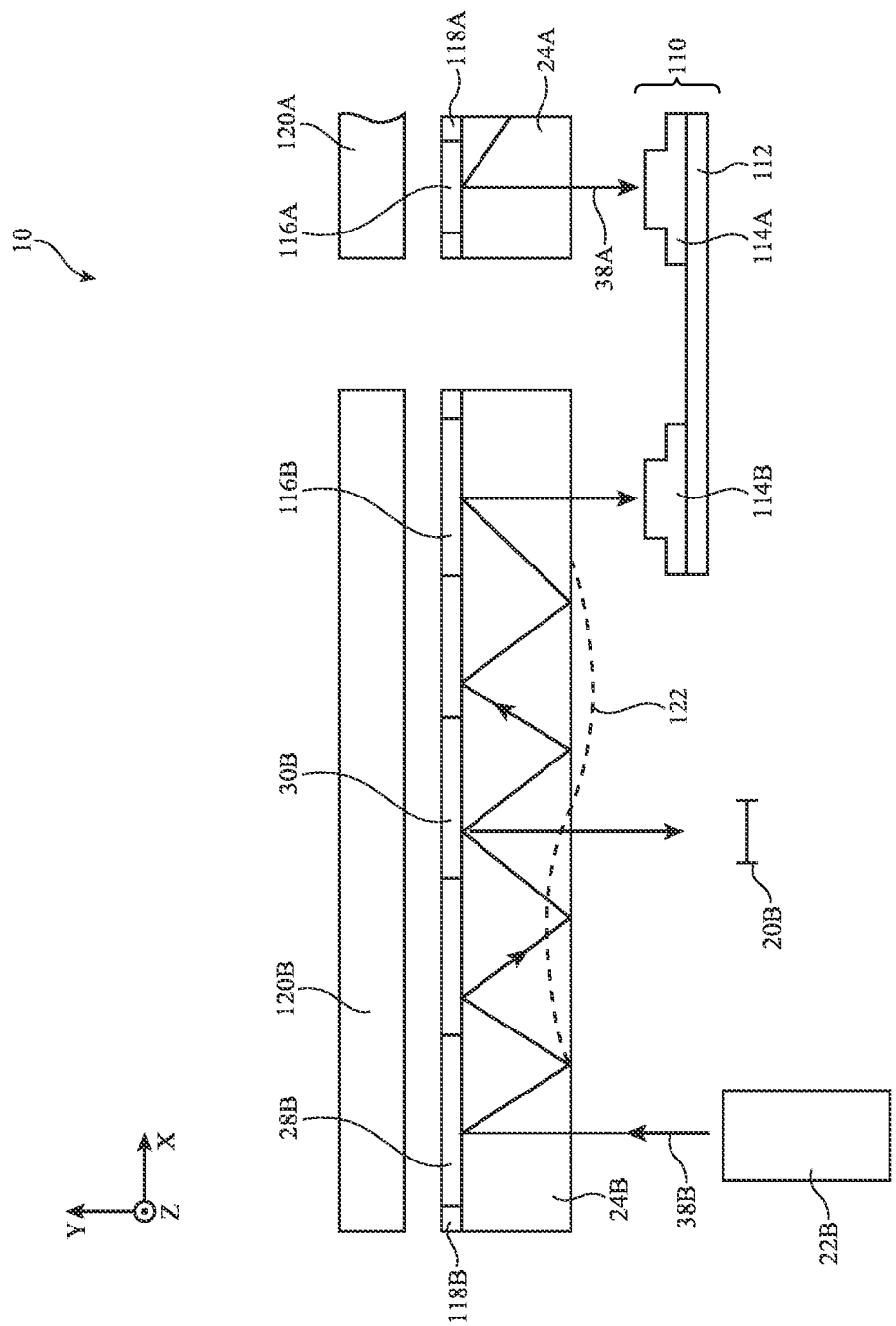
FIG. 4 is a top view of an illustrative head-mounted device having an optical bridge sensor that detects waveguide deformation in accordance with some embodiments.

Device 10 may perform in-field calibration operations to detect and optionally mitigate waveguide deformation and/or optical misalignment using a set of sensors. FIG. 4 is a top view showing how device 10 may include an optical bridge sensor that is used in detecting and mitigating waveguide deformation and/or optical misalignment.

As shown in FIG. 4, projector 22B may be optically coupled to a first (left) edge of waveguide 24B (e.g., a temple side/edge of the first waveguide). Projector 22B may emit image light 38B. Input coupler 28B may couple image light 38B into waveguide 24B (e.g., within the total internal reflection (TIR) range of the waveguide). Waveguide 24B may propagate image light 38B in the +X direction via total internal reflection. Cross-coupler 32B (FIG. 3) has been omitted from FIG. 4 for the sake of clarity but, if desired, the cross-coupler 32B may redirect and/or expand image light 38B. Output coupler 30B may couple a first portion of image light 38B out of waveguide 24B and towards eye box 20B. A second portion of image light 38B may continue to propagate along waveguide 24B without being diffracted by output coupler 30B. Waveguide 24A may similarly propagate image light from projector 22A (FIG. 2) in the −X direction.

An optical sensor such as optical bridge sensor 110 may be disposed in device 10 at an opposite end of waveguide 24B from projector 22B. For example, optical bridge sensor 110 may be disposed within nose bridge NB of main portion 18M of the housing (FIG. 2). Optical bridge sensor 110 may be optically coupled to waveguides 24B and 24A and may, if desired, be mounted to waveguides 24A and 24B (e.g., using a mounting bracket or frame). Waveguide 24B may include an additional output coupler 116B at the end of waveguide 24B opposite projector 22B (sometimes referred to herein as supplemental output coupler 116B, bridge output coupler 116B, or bridge sensor output coupler 116B). The additional output coupler may couple some of the image light propagating through waveguide 24B (e.g., the second portion of image light 38B not coupled out of the waveguide by output coupler 30B) out of waveguide 24B and into optical bridge sensor 110. Similarly, waveguide 24A may include an additional output coupler 116A that couples some of the image light propagating through waveguide 24A out of waveguide 24A and into optical bridge sensor 110.

Optical bridge sensor 110 may include one or more image sensors 114 that gather (e.g., generate, capture, detect, measure, produce, etc.) image sensor data (sometimes referred to herein as optical bridge sensor image data) from the image light coupled out of waveguides 24A and 24B. Image sensors 114 may be mounted to a common package or substrate such as substrate 112 (e.g., a rigid or flexible printed circuit board). Image sensors 114 may include a first (left) image sensor 114B that receives image light 38B from output coupler 116B and a second (right) image sensor 114A that receives image light 38A from output coupler 116A. Alternatively, image sensors 114 may include a single image sensor that receives both image light 38A and 38B. The image sensor data gathered by optical bridge sensor 110 may be a real-time representation of the image data that is actually being provided to eye boxes 20A and 20B after propagating from the projectors 22 and through the waveguides 24. The optical bridge sensor image data may therefore allow for real-time measurement of the image light provided to the eye boxes.

Optical bridge sensor 110 may sometimes also be referred to as an optical misalignment detection sensor, an optical alignment sensor, or an optical misalignment detection module. If desired, optical bridge sensor 110 may be integrated within a sensor housing. The sensor housing may be formed from a part of main portion 18M of housing 18 within nose bridge NB (FIG. 1), may be a separate housing enclosed within nose bridge NB of main portion 18M, may be a frame or bracket that supports housing portion 18M, or may be omitted. Optical bridge sensor 110 may have a first end mounted or coupled to waveguide 24B and may have an opposing second end mounted or coupled to waveguide 24A (e.g., using optically clear adhesive or other mounting structures).

Output couplers 116A and 116B may be formed from output coupling prisms or waveguide facets, mirrors (e.g., louvered mirrors), or diffractive grating structures such as surface relief gratings or volume holograms. In the example of FIG. 4, output couplers 116A and 116B are diffractive gratings in a layer of grating medium such as surface relief gratings (SRGs) in a layer of SRG medium. For example, output coupler 116B may include an SRG in a layer of SRG medium 118B on waveguide 24B. Similarly, output coupler 116A may include an SRG in a layer of SRG medium 118A on waveguide 24A. If desired, input coupler 28B and output coupler 30B may also be formed from SRGs in SRG medium 118B. Waveguide 24B may be provided with a cover layer 120B disposed over SRG medium 118B that protects the SRGs in SRG medium 118B from contaminants or damage. Similarly, waveguide 24A may be provided with a cover layer 120A disposed over SRG medium 118A. The example of FIG. 4 is merely illustrative and, in general, input coupler 28B, output coupler 30B, and output coupler 116B may be formed from any desired optical coupler structures integrated into or onto waveguide 24B in any desired manner.

The image sensor data gathered by optical bridge sensor 110 may be used to detect deformation within the waveguide that propagated the corresponding image light. For example, projector 22B may include a predetermined pattern of image data within image light 38B that is used for detecting deformation of waveguide 24B. The predetermined pattern may include a pattern of calibration shapes such as dots. The predetermined pattern of image data (e.g., the pattern of calibration shapes or dots) may sometimes be referred to herein as a calibration pattern.

Image sensor 114B in optical bridge sensor 110 may generate image sensor data from the image light 38B coupled out of waveguide 24B by output coupler 116B. The image sensor data may include the calibration pattern. Control circuitry in device 10 may process the image sensor data (e.g., the calibration pattern) captured by image sensor 114B to detect the presence of deformation in waveguide 24B. The deformation may involve the unintended bending or warping of waveguide 24B, the deformation of one or more surfaces of waveguide 24B such as the warping of waveguide surface 122, or any other deformation that may cause the image light 38B provided to eye box 20B to appear distorted. The control circuitry may detect the warping of waveguide 24B (sometimes referred to herein as waveguide deformation) based on the image sensor data captured by image sensor 114B and may, if desired, perform actions to mitigate the detected warping or to notify the user of device 10 about the detected warping. Image sensor 114A may similarly be used to detect warping of waveguide 24A.

The example of FIG. 4 is merely illustrative. If desired, optical bridge sensor 110 may be mounted to the world-facing side of waveguides 24A and 24B. If desired, a third waveguide may be used to propagate the image light 38B coupled out of waveguide 24B by output coupler 116B and to propagate the image light 38A coupled out of waveguide 24A by output coupler 116A towards the image sensor(s) of optical bridge sensor 110. The third waveguide may include one or more input couplers that couple the image light into the third waveguide and may include one or more couplers that couple the image light out of the third waveguide and into optical bridge sensor 110. The image sensor data captured by image sensors 114A and 114B may be also used to detect optical misalignment between the left and right displays in device 10 (e.g., between waveguide 24A and waveguide 24B, between projector 22B and projector 22A (FIG. 2), etc.). For example, a pattern in the image data captured by image sensor 114B may be compared to a pattern in the image data captured by image sensor 114A and/or to an expected pattern of image data (e.g., the known emitted image data from one or both projectors) to detect optical misalignment between the left and right sides of device 10. The calibration pattern may also be used to detect optical misalignment.

Figure 5:
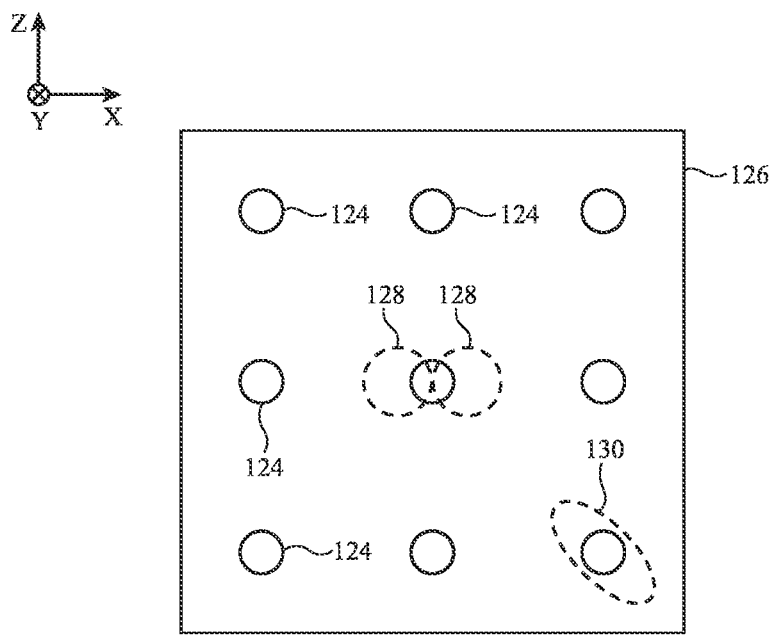
FIG. 5 is a front view of an illustrative calibration pattern that may be used to detect waveguide deformation in accordance with some embodiments.

FIG. 5 is a front view showing one illustrative calibration pattern that may be included in image light 38B for detecting waveguide deformation for waveguide 24B (e.g., as viewed from the field of view of image sensor 114B in the +Y direction of FIG. 4). As shown in FIG. 5, image light 38B may have a field of view 126 and may include a calibration pattern such as a predetermined pattern of dots 124 (e.g., projector 22B may emit the predetermined pattern of dots 124 in image light 38B). Each dot 124 may correspond to one or more pixels of image data arranged in a predetermined pattern (e.g., dots 124 need not be round and may in general have any shape or include any pattern of pixels, and may therefore sometimes be referred to herein as calibration shapes 124). The calibration pattern may include any desired number of dots 124 (e.g., one or more dots 124) arranged in any desired manner (e.g., the calibration pattern may include a rectangular grid pattern of dots arranged in rows and columns, a hexagonal grid pattern of dots, or any other desired pattern of dots).

When no waveguide deformation is present, image sensor 114B will gather image sensor data that includes dots 124 in the same positions and with the same shapes as emitted by projector 22B. However, when waveguide deformation is present in waveguide 24B, one or more of the dots may appear distorted, at a different position than as emitted by projector 22B, and/or with a different shape than as emitted by projector 22B by the time the calibration pattern is received at the image sensor. For example, one or more dots 124 may appear as a double image 128 and/or one or more dots 124 may appear as an elongated (distorted) dot 130 by the time the image light 38B reaches image sensor 114B. Double images 128 and elongated dots 130 may be produced by deformation of waveguide 24B.

Figure 6:
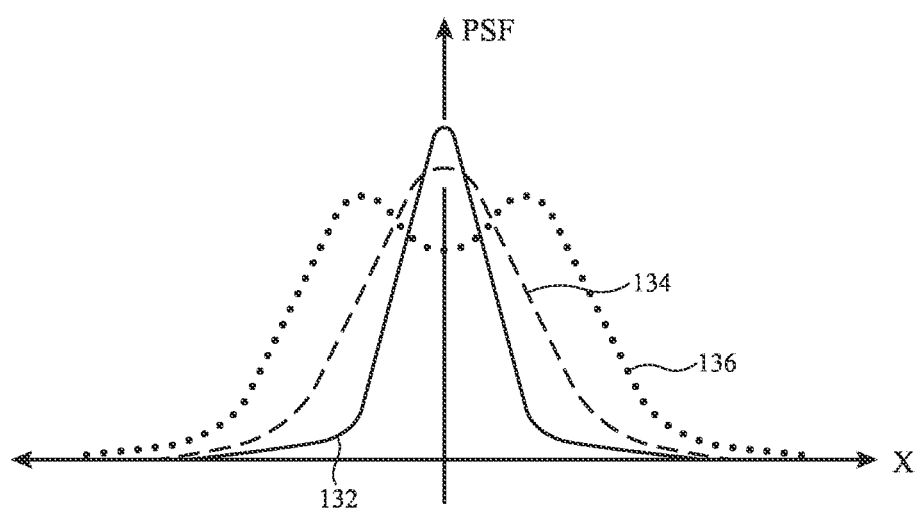
FIG. 6 is a plot of illustrative point spread functions of a dot in a calibration pattern under different waveguide deformation conditions in accordance with some embodiments.

Each dot 124 in the calibration pattern emitted by projector 22B may be characterized by a corresponding point spread function (PSF) in the image data captured by image sensor 114B. FIG. 6 is a plot showing how the point spread function of a given dot 124 may vary under different waveguide deformation conditions. The vertical axis of FIG. 6 plots the point spread function (e.g., intensity) and the horizontal axis of FIG. 6 plots position across field of view 126 (e.g., along the X-axis of FIGS. 4 and 5).

Curve 132 plots an illustrative PSF of a given dot 124 as captured by image sensor 114B (e.g., within the image light 38B coupled out of waveguide 24B by output coupler 116B) without the presence of waveguide distortion. As shown by curve 132, the undistorted PSF of dot 124 is relatively symmetric, uniform, and narrow in space along the X-axis.

Curve 134 plots an illustrative PSF of the given dot 124 as captured by image sensor 114B in the presence of waveguide distortion. Curve 134 may, for example, be the PSF of an elongated (distorted) dot such as dot 130 of FIG. 5. As shown by curve 134, waveguide distortion may serve to broaden the PSF of the dot (e.g., curve 134 exhibits a wider peak width than curve 132).

Curve 136 plots an illustrative PSF of the given dot 124 as captured by image sensor 114B in the presence of another type of waveguide distortion. Curve 136 may, for example, be the PSF of a double image (distorted) dot such as double image 128 of FIG. 5. As shown by curve 136, waveguide distortion may serve to split the PSF of the dot between two peaks rather than a single narrow peak. The example of FIG. 6 is merely illustrative and, in general, the PSF may have any desired nominal (e.g., expected) shape in the absence of waveguide distortion (e.g., corresponding to the shape of the image data in the pattern projected by projector 22B) and the waveguide distortion may cause other alterations or distortions to the shape of the PSF. Control circuitry may process the PSF of each dot 124 in the pattern of dots captured by image sensor 114B to characterize and detect the waveguide distortion present in waveguide 24B.

The example of FIG. 4 in which the calibration pattern is included in image light 38B is merely illustrative. If desired, the calibration pattern may be included in infrared light produced by one or more infrared emitters. The calibration pattern of dots 124 shown in FIG. 5 and characterized by the point spread functions of FIG. 6 may, for example, be included in the infrared light rather than the visible light of image light 38B. As described herein, the term "infrared light" includes infrared wavelengths and/or near-infrared (NIR) wavelengths. Since infrared light is not visible to the unaided human eye (e.g., at eye box 20B), using infrared light to display the calibration pattern minimizes any impact that displaying the calibration pattern has on the viewing experience of the user.

Figure 7:
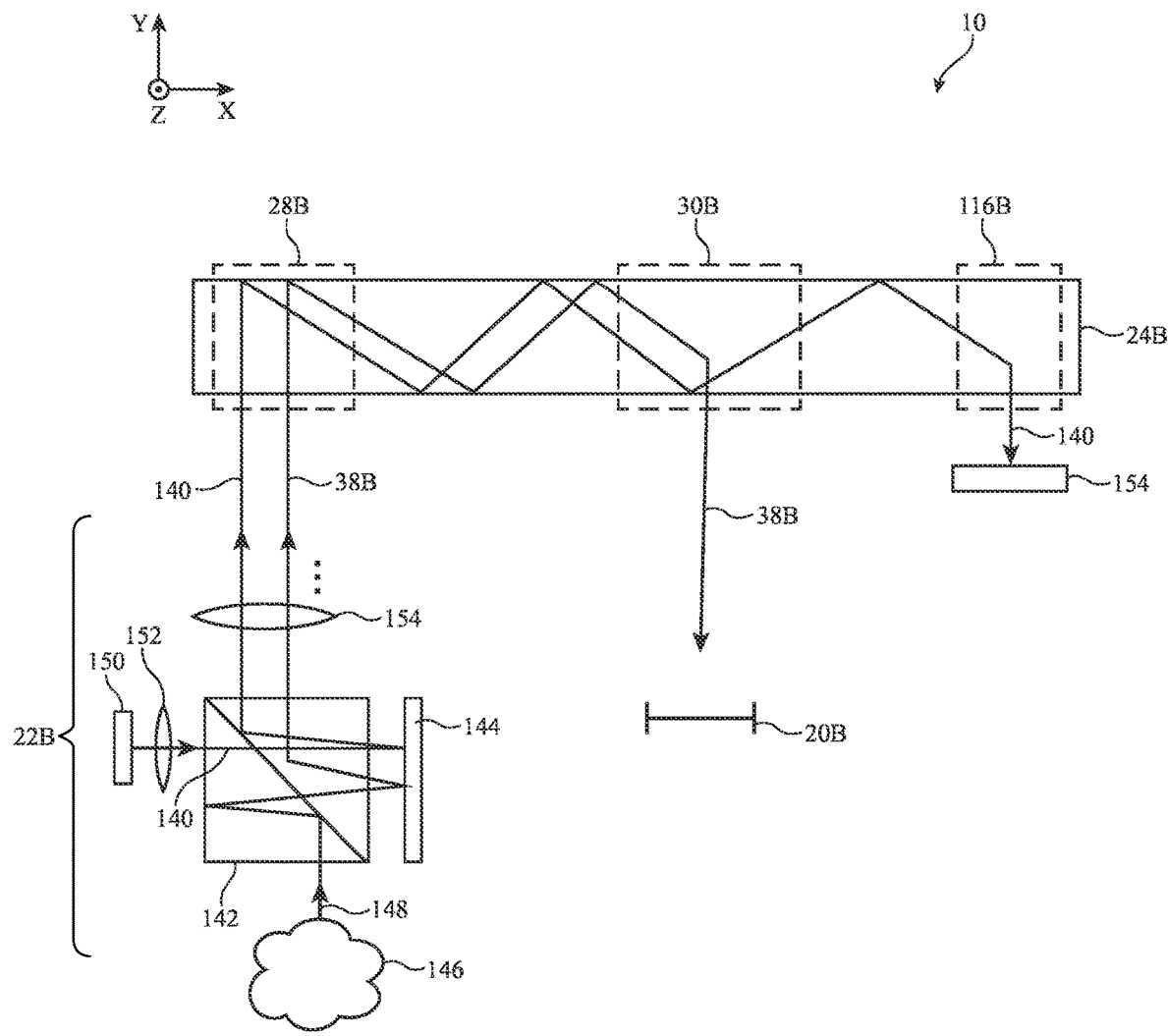
FIG. 7 is a top view of an illustrative head-mounted device having an infrared sensor and a projector with an infrared emitter for detecting waveguide deformation in accordance with some embodiments.

If desired, an infrared emitter that emits the calibration pattern (e.g., one or more dots 124 of FIG. 5) may be integrated within projector 22B. FIG. 7 is a top view showing one example of how projector 22B may include an infrared emitter that emits infrared light that includes the calibration pattern. As shown in FIG. 7, projector 22B may include illumination optics 146. Illumination optics 146 may include one or more light sources that emit illumination light 148 in one or more visible wavelength ranges (e.g., red, green, and blue illumination light).

Projector 22B may include a spatial light modulator such as reflective spatial light modulator 144. Reflective spatial light modulator 144 may include a digital micromirror device (DMD) panel, a liquid crystal on silicon (LCOS) panel, a ferroelectric liquid crystal on silicon (fLCOS) panel, or other spatial light modulators. Optics 142 (e.g., one or more optical wedges or prisms, partial reflectors, polarizers, reflective polarizers, or other structures) may direct illumination light 148 to reflective spatial light modulator 144.

Reflective spatial light modulator 148 may be controlled using image data to selectively reflect illumination light 148 at different pixel positions (e.g., as determined by the image data) to produce image light 38B. In other words, reflective spatial light modulator 148 may modulate image data onto illumination light 148 to produce image light 38B or may modulate illumination light 148 using the image data to produce image light 38B. Optics 142 may redirect image light 38B towards input coupler 28B on waveguide 24B. Collimating optics 154 in projector 22B may help to direct and collimate image light 38B towards input coupler 28B. The image data provided to reflective display panel 144 may include the calibration pattern. In examples where image light 38B includes the calibration pattern, the calibration pattern is included in image light 38B via modulation onto illumination light 148 by reflective spatial light modulator 144.

In examples where projector 22B emits infrared light that includes the calibration pattern (e.g., as shown in FIG. 7), projector 22B may include one or more infrared emitters such as infrared emitter 150. Infrared emitter 150 may emit infrared light 140, which is directed towards reflective spatial light modulator 144 by lens 152 and optics 142. Reflective display panel 144 reflects infrared light 140 while modulating the calibration pattern onto the infrared light (e.g., producing the calibration pattern in infrared light 140). Optics 142 and collimating optics 154 may direct infrared light 140 to input coupler 28B. Input coupler 28B may couple infrared light 140 into waveguide 24B, which propagates infrared light 140 via total internal reflection. Output coupler 30B may couple image light 38B out of waveguide 24B (e.g., at visible wavelengths) without coupling infrared light 140 out of waveguide 24B.

Output coupler 116B may couple infrared light 140 out of waveguide 24B and towards an infrared image sensor 154. Infrared image sensor 154 may be included in optical bridge sensor 110 (FIG. 4) or may be separate from optical bridge sensor 110. Optical bridge sensor 110 may also be omitted if desired. Infrared image sensor 154 may generate image sensor data from infrared light 140 (e.g., infrared image sensor data). The image sensor data may include the calibration pattern (e.g., dots 124 of FIG. 5). Control circuitry may process the image sensor data and its calibration pattern to detect the distortion of waveguide 24B. If desired, the control circuitry may also capture infrared light that has reflected off the user's eye at eye box 20B and may use this captured infrared light to perform gaze tracking operations.

The example of FIG. 7 is merely illustrative. If desired, reflective spatial light modulator 144 and optics 142 may be replaced with a transmissive spatial light modulator. Infrared emitter 150 may include an array of infrared-emitting pixels that emit the calibration pattern (e.g., the calibration pattern need not be produced by the spatial light modulator). Infrared emitter 150 may be included in illumination optics 146. If desired, infrared emitter(s) 150 may be located at or on waveguide 24B external to projector 22B.

Figure 8:
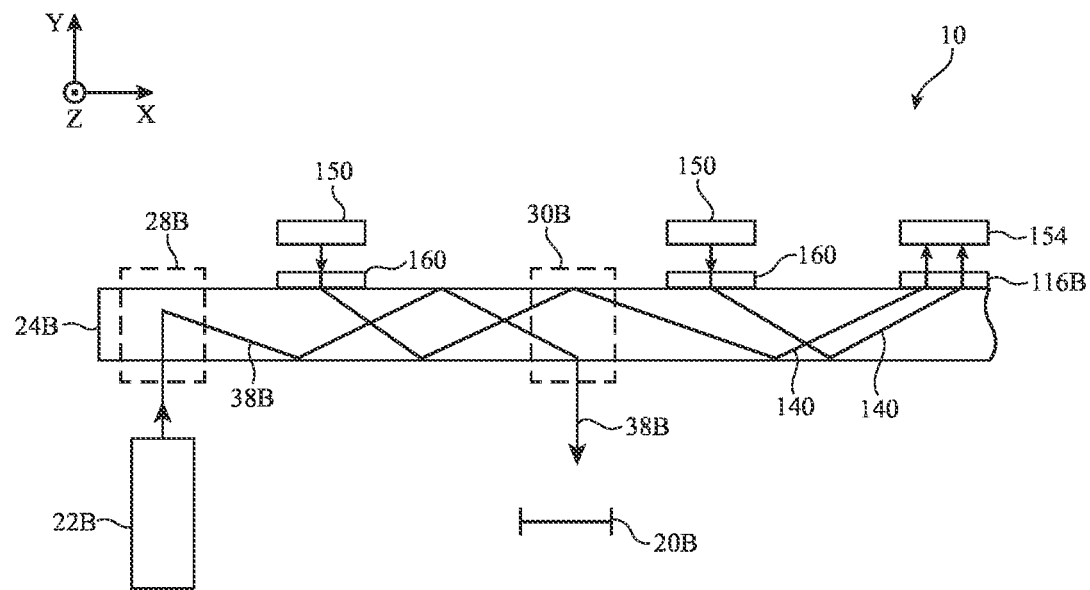
FIG. 8 is a top view of an illustrative head-mounted device having an infrared sensor and a set of infrared emitters mounted to a waveguide for detecting waveguide deformation in accordance with some embodiments.

FIG. 8 is a top view showing one example of how multiple infrared emitters 150 may be mounted at or on waveguide 24B. As shown in FIG. 8, infrared emitters 150 may be mounted at or on waveguide 24B. Infrared emitters 150 may collectively emit infrared light 140 that includes the calibration pattern (e.g., the pattern of dots 124 of FIG. 5). Infrared input couplers 160 may couple infrared light 140 into waveguide 24, which propagates the infrared light towards output coupler 116B via total internal reflection. Output coupler 116B may couple infrared light 140 out of waveguide 24B and towards infrared image sensor 154. Infrared input couplers 160 may include input coupling prisms, facets, partial reflectors, mirrors, louvered mirrors, SRGs, volume holograms, or any other desired optical couplers. In one example, each infrared input coupler 160 and output coupler 116B may be formed from respective SRGs in the same layer of SRG medium disposed on waveguide 24B (e.g., the same layer of SRG medium used to form SRGs in input coupler 28B and/or output coupler 30B).

The example of FIG. 8 in which infrared emitters 150 and infrared image sensor 154 are mounted at the world-facing side of waveguide 24B is merely illustrative. If desired, one or more of infrared emitters 150 and/or infrared image sensor 154 may be disposed on the head-facing side of waveguide 24B. If desired, infrared emitters 150 may be mounted around the lateral periphery of waveguide 24B.

Figure 9:
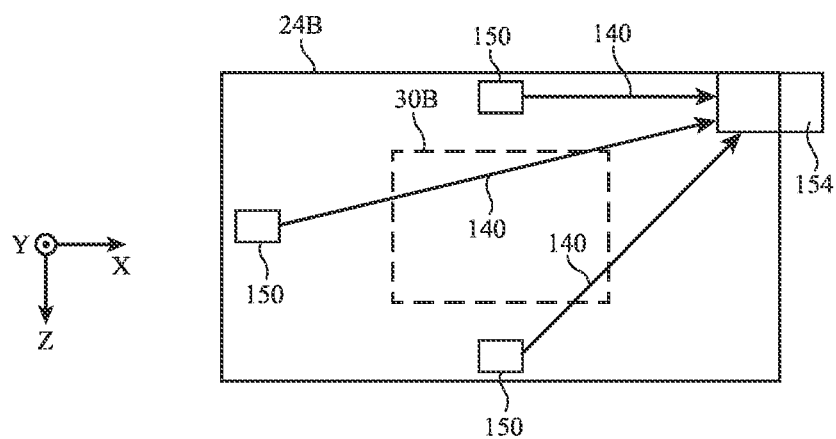
FIG. 9 is a front view of an illustrative head-mounted device having an infrared sensor and a set of infrared emitters mounted to a waveguide for detecting waveguide deformation in accordance with some embodiments.

FIG. 9 is a front view showing one example of how infrared emitters 150 may be mounted at the lateral periphery of waveguide 24B (e.g., as viewed in the −Y direction of FIG. 8). As shown in FIG. 9, waveguide 24B may have a field of view overlapping output coupler 30B. Infrared image sensors 150 may be mounted around the periphery of output coupler 30B and along the periphery of waveguide 24B (e.g., so as not to block the field of view of the user). Infrared emitters 150 may emit infrared light 140 into waveguide 24B, which propagates the infrared light towards infrared image sensor 154 (e.g., in the nose bridge of the device). Infrared image sensor 154 may capture image sensor data from infrared light 140 and control circuitry may process the image sensor data to detect deformation of waveguide 24B and/or to perform gaze tracking.

The infrared emitters and infrared sensor of FIGS. 8 and 9 may, if desired, be used to map aging or changes in the shape (e.g., deformation) of waveguide 24B over time. The infrared sensor may measure intensity of the infrared light coupled out of the waveguide by output coupler 116B. If desired, infrared light emitters 150 may be sequentially modulated to allow the control circuitry to disambiguate the signal received by the infrared sensor. For example, each infrared light emitter 150 may emit infrared light within a respective time period to allow the control circuitry to determine which infrared light source emitted the corresponding image sensor data gathered by the infrared sensor. Since the infrared light emitted by each infrared emitter travels along a respective optical path through the waveguide, this may allow the control circuitry to identify changes in different regions of the waveguide from the infrared light from each infrared emitter, thereby mapping deformation or aging of the waveguide over time. Periodic measurement may allow the control circuitry to generate a map of waveguide aging (e.g., changes in absorption or other properties over time). If desired, the information gathered by the infrared image sensor may be used to adjust the color uniformity of the image light to compensate for the identified waveguide aging.

The example of FIGS. 8 and 9 are merely illustrative. There may be only one infrared emitter on waveguide 24B or there may be more than three infrared emitters on waveguide 24B. The components shown in FIGS. 3-9 for the left side of device 10 may also be formed on the right side of device 10 to detect deformation of waveguide 24A (FIG. 2). The image sensor used to capture image sensor data of the calibration pattern (e.g., a visible light image sensor for capturing image sensor data from the calibration pattern included in image light 38B or infrared image sensor 154) may be located anywhere on device 10 and need not be located in the nose bridge.

Figure 10:
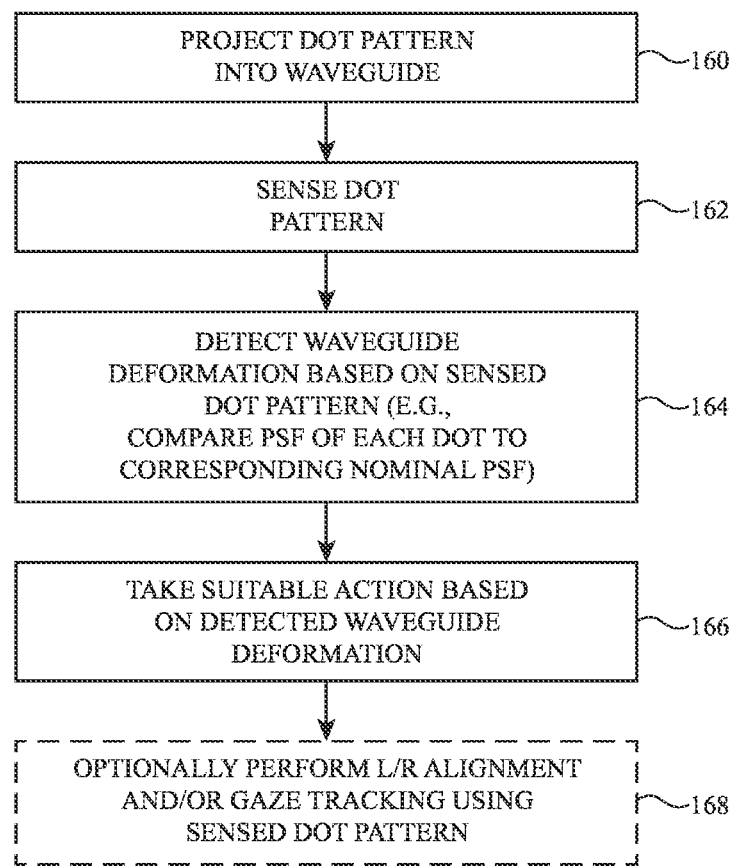
FIG. 10 is a flow chart of illustrative operations involved in using a system of the type shown in FIGS. 1-9 to detect waveguide deformation in accordance with some embodiments.

FIG. 10 is a flow chart of illustrative operations involved in detecting the deformation of waveguide 24B using device 10. Similar operations may also be used to detect the deformation of waveguide 24A.

At operation 160, device 10 may project a calibration pattern into waveguide 24B. The calibration pattern may include a pattern of one or more dots 124 (FIG. 5). Device 10 may project the calibration pattern periodically, upon device start-up or power-on, when display data begins to be displayed, after detecting a drop or impact event (e.g., using a motion sensor), upon receipt of a user input instructing device 10 to detect waveguide deformation, upon installation of a software update, or at any other desired time or in response to any desired trigger condition.

Each dot 124 may have any desired (predetermined) shape formed from one or more pixels of infrared or visible light. The calibration pattern may be included as visible light in image light 38B (e.g., as shown in FIG. 4), may be included in infrared light 140 emitted by projector 22B (e.g., as shown in FIG. 7), or may be included in infrared light 140 emitted by one or more infrared emitters 150 disposed on waveguide 24B and external to projector 22B (e.g., as shown in FIGS. 8 and 9). Waveguide 24B may propagate the calibration pattern in image light 38B or infrared light 140 via total internal reflection. Output coupler 116B may couple a portion of image light 38B or infrared light 140 and thus the calibration pattern out of waveguide 24B and towards image sensor 114B (FIG. 4) or infrared image sensor 154 (FIGS. 7-9). Waveguide 24B and output coupler 30B may concurrently direct image light 38B towards eye box 20B.

At operation 162, image sensor 114B or infrared image sensor 154 may sense the calibration pattern (e.g., the pattern of dots 124 of FIG. 5) coupled out of waveguide 24B by output coupler 116B. For example, image sensor 114B may capture image sensor data of image light 38B that includes the calibration pattern or infrared image sensor 154 may gather image sensor data of infrared light 140 that includes the calibration pattern.

At operation 164, control circuitry (e.g., one or more processors) on device 10 may detect waveguide deformation in waveguide 24B based on (using) the sensed calibration pattern (e.g., based on the image sensor data gathered by image sensor 114B or infrared image sensor 154). Deformation in waveguide 24B (e.g., warping of surface 122 as shown in FIG. 4) may alter one or more of the dots 124 in the calibration pattern and/or the position between two or more of the dots 124 in the calibration pattern by the time the calibration pattern is coupled out of waveguide 24B by output coupler 116B. The control circuitry may identify (e.g., generate, detect, produce, estimate, etc.) one or more point spread functions (PSFs) for the calibration pattern in the gathered image sensor data. The control circuitry may, for example, identify the PSF for each dot 124 in the calibration pattern (e.g., PSFs as shown in FIG. 6).

The control circuitry may detect waveguide deformation based on the PSF(s) for the calibration pattern. For example, the control circuitry may compare the shape of the dots 124 in the gathered image data or the shape of the PSFs associated with dots 124 to the nominal (e.g., predetermined, expected, or known) shape or PSF of the dots 124 as transmitted in image data 38B or infrared light 140 (e.g., to detect one or more elongated dots 130 or double images 128 as shown in FIG. 5). The extent to which the shape of one or more of dots 124 or PSFs in the gathered image data differ from the shape of the dots or PSFs as transmitted into waveguide 24B may be indicative of the waveguide deformation. The control circuitry may detect waveguide deformation when the shape/location of one or more of the dots or PSFs in the gathered image data differ from the shape/location of the corresponding dots or the shape of the PSFs coupled into waveguide 24B by an amount that exceeds a threshold value, for example. If desired, the control circuitry may characterize (e.g., detect, identify, compute, etc.) the amount and/or type of waveguide deformation in waveguide 24B based on the gathered image data.

At operation 166, the control circuitry may take suitable action based on the detected waveguide deformation. For example, the control circuitry may issue an alert to the user or to a server identifying that waveguide deformation is present, may instruct the user to have some or all of device 10 repaired or replaced, and/or may instruct the user to mechanically adjust one or more components of device 10 or the position of device 10 on their head to mitigate the optical effects of the deformation. The control circuitry may perform one or more operations to mitigate the detected waveguide deformation. For example, the control circuitry may control one or more actuators or other mechanical adjustment structures to adjust the position of waveguide 24B, the orientation of waveguide 24B, the position of projector 22B, or the strain applied to waveguide 24B in a manner that reverses or mitigates the distortions produced on the image light by the detected amount of waveguide deformation. As another example, the control circuitry may predistort, warp, or otherwise adjust (e.g., digitally transform, translate, rotate, etc.) the image data provided to projector 22B and used to produce image light 38B in a manner that mitigates the effects of the detected waveguide deformation (e.g., such that the waveguide deformation imparts onto image light 38 the reverse effect of the predistortion or warping in the image data such that the image data appears at eye box 20B undistorted or un-warped). These examples are merely illustrative.

At optional operation 168, the control circuitry may adjust the optical alignment between the left half of device 10 and the right half of device 10 based on the image sensor data (e.g., the calibration pattern) gathered by image sensor 114B or infrared image sensor 154. For example, device 10 may adjust (e.g., correct, calibrate, alter, etc.) optical alignment between projector 22B, projector 22A, waveguide 24B, and/or waveguide 24A based on the sensed calibration pattern. The adjustments may include adjustments to the image data displayed at eye box 20B using the image light 38B produced by projector 22B and/or adjustments to the image data displayed at eye box 20A using the image light 38A produced by projector 22A (e.g., image warping, geometric transforms, image distortion, image translations, etc.) and/or may include mechanical adjustments to one or more of projector 22B, projector 22A, waveguide 24B, and/or waveguide 24A. For example, in response to determining that binocular misalignment and/or real-world object registration is misoriented with respect to one or both of the displays leading to undesired image warping, the control circuitry of a device may be used to apply a geometric transform to the images being output by the display. The geometric transform may create an equal and opposite amount of image warping, so that the images viewed in the eye boxes are free from misalignment-induced distortion. As an example, device 10 may calibrate (e.g., correct, compensate, mitigate, etc.) in-field drift between the left and right displays based on the calibration pattern in the optical bridge sensor image data (e.g., since the optical bridge sensor data is a real-time measure of the image light provided to the eye box by the left and right projectors and is thereby indicative of binocular misalignment). Device 10 may additionally or alternatively perform gaze tracking operations using the calibration pattern (e.g., in implementations where the calibration pattern is included in infrared light 140).

The foregoing is merely illustrative and various modifications can be made to the described embodiments. The foregoing embodiments may be implemented individually or in any combination.

What is claimed is:

1. An electronic device, comprising:
   a waveguide;
   an input coupler on the waveguide and configured to couple light into the waveguide;
   a first output coupler on the waveguide and configured to couple a first portion of the light out of the waveguide;
   a second output coupler on the waveguide and configured to couple a second portion of the light out of the waveguide, wherein the first output coupler is configured to pass the second portion of the light to the second output coupler;
   an image sensor configured to generate image sensor data based on the second portion of the light coupled out of the waveguide by the second output coupler; and
   one or more processors configured to detect a deformation of the waveguide based on the image sensor data.

2. The electronic device of claim 1, wherein the image sensor data comprises a calibration pattern from the light, the one or more processors being configured to detect the deformation based on the calibration pattern in the image sensor data.

3. The electronic device of claim 2, wherein the one or more processors is configured to identify a point spread function (PSF) associated with the calibration pattern in the image sensor data and is configured to detect the deformation based on the PSF.

4. The electronic device of claim 3, wherein the one or more processors is configured to detect the deformation based on the PSF by comparing the PSF to a nominal PSF associated with the calibration pattern.

5. The electronic device of claim 2, wherein the calibration pattern comprises a set of dots.

6. The electronic device of claim 1, further comprising:
   a projector configured to project visible image light into the waveguide, wherein the input coupler is configured to couple the visible image light into the waveguide and the first output coupler is configured to couple the visible image light out of the waveguide.

7. The electronic device of claim 6, wherein the visible image light coupled into the waveguide includes the second portion of the light coupled out of the waveguide by the second output coupler.

8. The electronic device of claim 6, wherein the second portion of the light coupled out of the waveguide by the second output coupler comprises infrared light and wherein the projector comprises an infrared emitter configured to emit the infrared light.

9. The electronic device of claim 8, wherein the projector comprises a reflective spatial light modulator configured to reflect the infrared light while modulating the infrared light using a calibration pattern and wherein the reflective spatial light modulator is configured to produce the visible image light by reflecting illumination light using image data.

10. The electronic device of claim 6, wherein the one or more processors is configured to adjust the visible image light based on the detected deformation of the waveguide.

11. The electronic device of claim 1, further comprising:
a layer of surface relief grating (SRG) medium on the waveguide, wherein the input coupler comprises a first SRG in the layer of SRG medium, the first output coupler comprises a second SRG in the layer of SRG medium, and the second output coupler comprises a third SRG in the layer of SRG medium.

12. The electronic device of claim 1, wherein the second portion of the light coupled out of the waveguide by the second output coupler comprises infrared light, the image sensor comprises an infrared image sensor, and the electronic device further comprises:
one or more infrared emitters mounted to the waveguide and configured to emit the infrared light.

13. A method of operating a display system comprising:
with an input coupler, coupling infrared light that includes a calibration pattern into a waveguide;
with an output coupler, coupling the infrared light out of the waveguide;
with an infrared image sensor, generating image sensor data based on the light coupled out of the waveguide by the output coupler;
with one or more processors, detecting a deformation of the waveguide based on the calibration pattern as included in the image sensor data generated by the infrared image sensor; and
performing gaze tracking operations based at least in part on the infrared light.

14. The method of claim 13, wherein detecting the deformation comprises:
generating a point spread function (PSF) for the calibration pattern in the image sensor data; and
comparing the PSF with a nominal PSF associated with the calibration pattern.

15. The method of claim 14, further comprising:
with a projector, generating the infrared light by modulating illumination light using the calibration pattern, wherein the calibration pattern exhibits the nominal PSF in the infrared light as generated by the projector.

16. The method of claim 15, further comprising:
detecting a misalignment between the projector and an additional projector in the display system based on the calibration pattern as included in the image sensor data generated by the infrared image sensor.

17. A display system comprising:
a projector configured to generate light that includes a calibration image;
a waveguide;
an input coupler on the waveguide and configured to couple the light into the waveguide;
an output coupler on the waveguide and configured to couple the light out of the waveguide;
an image sensor configured to generate image sensor data based on the light coupled out of the waveguide by the output coupler; and
one or more processors configured to detect, based on the image sensor data, a change in the shape of the calibration image relative to the shape of the calibration image in the light as generated by the projector, the one or more processors being further configured to detect a warping of the waveguide based on the detected change in the shape of the calibration image.

18. The display system of claim 17, further comprising:
a projector configured to emit visible image light;
an additional input coupler on the waveguide that is separate from the input coupler and that is configured to couple the visible image light into the waveguide; and
an additional output coupler on the waveguide that is separate from the output coupler and that is configured to couple the visible image light out of the waveguide.

19. The display system of claim 17, wherein the light comprises infrared light and the image sensor comprises an infrared image sensor.

20. The display system of claim 17, wherein the calibration pattern comprises a dot.

\* \* \* \* \*